US011577490B2

(12) United States Patent
Oikawa et al.

(10) Patent No.: US 11,577,490 B2
(45) Date of Patent: Feb. 14, 2023

(54) HEAT INSULATING MATERIAL, METHOD FOR MANUFACTURING SAME, AND ELECTRONIC EQUIPMENT AND AUTOMOBILE USING SAME

(71) Applicant: Panasonic Intellectual Property Management Co., Ltd., Osaka (JP)

(72) Inventors: Kazuma Oikawa, Osaka (JP); Shigeaki Sakatani, Osaka (JP); Kazuhiro Nishikawa, Osaka (JP); Daido Komyoji, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 699 days.

(21) Appl. No.: 16/586,858

(22) Filed: Sep. 27, 2019

(65) Prior Publication Data

US 2020/0108583 A1 Apr. 9, 2020

(30) Foreign Application Priority Data

Oct. 5, 2018 (JP) .............................. JP2018-190082
Jul. 3, 2019 (JP) .............................. JP2019-124186

(51) Int. Cl.
   *B32B 9/00* (2006.01)
   *C01B 33/16* (2006.01)
   (Continued)

(52) U.S. Cl.
   CPC .............. *B32B 9/005* (2013.01); *B32B 5/022* (2013.01); *B32B 38/08* (2013.01);
   (Continued)

(58) Field of Classification Search
   None
   See application file for complete search history.

(56) References Cited

U.S. PATENT DOCUMENTS

| 6,911,192 B2 | 6/2005 | Nakanishi |
| 2005/0192366 A1 | 9/2005 | Ou et al. |

(Continued)

FOREIGN PATENT DOCUMENTS

| JP | 2007-519780 | 7/2007 |
| JP | 2015-048417 | 3/2015 |

(Continued)

OTHER PUBLICATIONS

Fukubayashi et al., Polymer Porous Body comprising Silica Particle, Nov. 12, 2015, machine translation of JP2015-199846 (Year: 2015).*
Chinese Search Report dated Dec. 10, 2021 for the related Chinese Patent Application No. 201910798941.7.

*Primary Examiner* — Chinessa T. Golden
(74) *Attorney, Agent, or Firm* — McDermott Will & Emery LLP

(57) ABSTRACT

A heat insulating material includes an aerogel that has macro-pores and meso-pores. A method for manufacturing a heat insulating material, including: a sol preparation step of adding a gelling agent into sodium silicate such that a molar ratio of the gelling agent relative to $NaO_2$ is 0.1 to 0.75, and adjusting a sol into which macro-pores are introduced by leaving unreacted Na and non-cross-linked oxygen in a siloxane skeleton; an impregnating and gelling step of impregnating a nonwoven fabric fiber structure with the sol to form a composite of hydrogel-nonwoven fabric fiber; a hydrophobizating step of mixing the formed composite of hydrogel-nonwoven fabric fiber with a silylating agent to modify a surface thereof; and a drying step of removing a liquid contained in the surface modified composite of hydrogel-nonwoven fabric fiber by drying under a temperature and pressure lower than respective critical values.

11 Claims, 6 Drawing Sheets

(51) Int. Cl.
     *C04B 14/06*      (2006.01)
     *C01B 33/158*      (2006.01)
     *B32B 5/02*      (2006.01)
     *B32B 38/08*      (2006.01)
     *D06N 3/12*      (2006.01)
     *B32B 5/18*      (2006.01)

(52) U.S. Cl.
     CPC .......... *C01B 33/1585* (2013.01); *C01B 33/16* (2013.01); *C04B 14/064* (2013.01); *D06N 3/128* (2013.01); *B32B 5/18* (2013.01); *B32B 2266/102* (2016.11); *B32B 2266/108* (2016.11); *B32B 2266/126* (2016.11); *B32B 2307/304* (2013.01); *B32B 2457/04* (2013.01)

(56) References Cited

U.S. PATENT DOCUMENTS

| | | |
|---|---|---|
| 2009/0317619 A1 | 12/2009 | Di Monte et al. |
| 2016/0016378 A1 | 1/2016 | Oikawa et al. |
| 2017/0266920 A1 | 9/2017 | Oikawa et al. |

FOREIGN PATENT DOCUMENTS

| | | | |
|---|---|---|---|
| JP | 2015-199845 | | 11/2015 |
| JP | 2015-199846 A | | 11/2015 |
| JP | 2015199846 A | * | 11/2015 |
| WO | 2003/002458 | | 1/2003 |
| WO | 2014/136073 A1 | | 9/2014 |
| WO | 2016/157784 | | 10/2016 |

\* cited by examiner

HEAT INSULATING MATERIAL, METHOD FOR MANUFACTURING SAME, AND ELECTRONIC EQUIPMENT AND AUTOMOBILE USING SAME

TECHNICAL FIELD

The technical field relates to a heat insulating material, a method for manufacturing the heat insulating material, and electronic equipment and an automobile using the heat insulating material. In particular, the present disclosure relates to an aerogel composite heat insulating material, a method for manufacturing the same, and usage of the same.

BACKGROUND

Currently, as an excellent heat insulating material, a heat insulating material in which silica aerogel is held in a fiber has been used (Japanese Patent No. 6064149, Japanese Patent Application No. 2014-79802, and Japanese Patent Application No. 2013-181138).

SUMMARY

The insulating material using the silica aerogel in related arts has a problem that, when the insulating material is used by being sandwiched in a variety of equipment, density thereof increases due to compression, and thermal conductivity increases (thermal resistance decreases).

Therefore, an object of the present application is to provide a heat insulating material whose thermal conductivity does not increase even when being compressed and deformed, a method for manufacturing the heat insulating material, and electronic equipment and an automobile using the heat insulating material.

A heat insulating material according to an exemplary embodiment includes an aerogel that has macro-pores and meso-pores is used. A piece of electronic equipment can include the heat insulating material between an electronic component with heat generation and a housing. An automobile can include the heat insulating material between batteries.

In addition, a method for manufacturing a heat insulating material, includes: a sol preparation step of adding a gelling agent into sodium silicate such that a molar ratio of the gelling agent relative to $NaO_2$ is 0.1 to 0.75, and adjusting a sol into which macro-pores are introduced by leaving unreacted Na and non-cross-linked oxygen in a siloxane skeleton; an impregnating and gelling step of impregnating a nonwoven fabric fiber structure with the sol to form a composite of hydrogel-nonwoven fabric fiber; a hydrophobizating step of mixing the formed composite of hydrogel-nonwoven fabric fiber with a silylating agent to modify a surface thereof; and a drying step of removing a liquid contained in the surface modified composite of hydrogel-nonwoven fabric fiber by drying under a temperature and pressure lower than respective critical values.

In the aerogel composite heat insulating material having macro-pores and meso-pores of the disclosure, the macro-pores that do not contribute to reduction in thermal conductivity due to compression deformation are significantly reduced, so that the thermal conductivity is lowered, and it is ensured that, when the aerogel composite heat insulating material is used by being sandwiched between square batteries, even if the batteries expand, heat insulating property is equal to or higher than that before the expansion.

DESCRIPTION OF EMBODIMENTS

Next, the present embodiment will be described by citing a preferred embodiment of the disclosure.

<Design Concept of Aerogel Composite Heat Insulating Material Having Macro-Pores>

An aerogel composite heat insulating material including a silica aerogel and a nonwoven fabric fiber is known so far. Many of the materials are improved in handleability. However, the aerogel composite heat insulating material does not have strength capable of withstanding a load of 5 MPa. Therefore, meso-pores in the aerogel composite heat insulating material are collapsed by compression deformation. As a result, in the aerogel composite heat insulating material, contact points between silica particles rapidly increases, and density thereof increases, which causes an increase in thermal conductivity.

The greatest feature of the aerogel composite heat insulating material of the embodiment is that the aerogel has macro-pores 2 of 1 to 10 μm and meso-pores 1 of 2 to 50 nm. Therefore, even when a high load of 5 MPa is applied to the heat insulating material, the thermal conductivity of the aerogel composite heat insulating material does not increase (deteriorate). Rather, the thermal conductivity of the aerogel composite heat insulating material decreases (improves). A mechanism will be described later.

A bimodal fine pore distribution of the macro-pores 2 and the meso-pores 1 is described. Here, the bimodal fine pore distribution refers to a fine pore distribution with two peaks, and is also referred to as "bimodality". However, it is not necessary to be bimodal.

Figure 1:
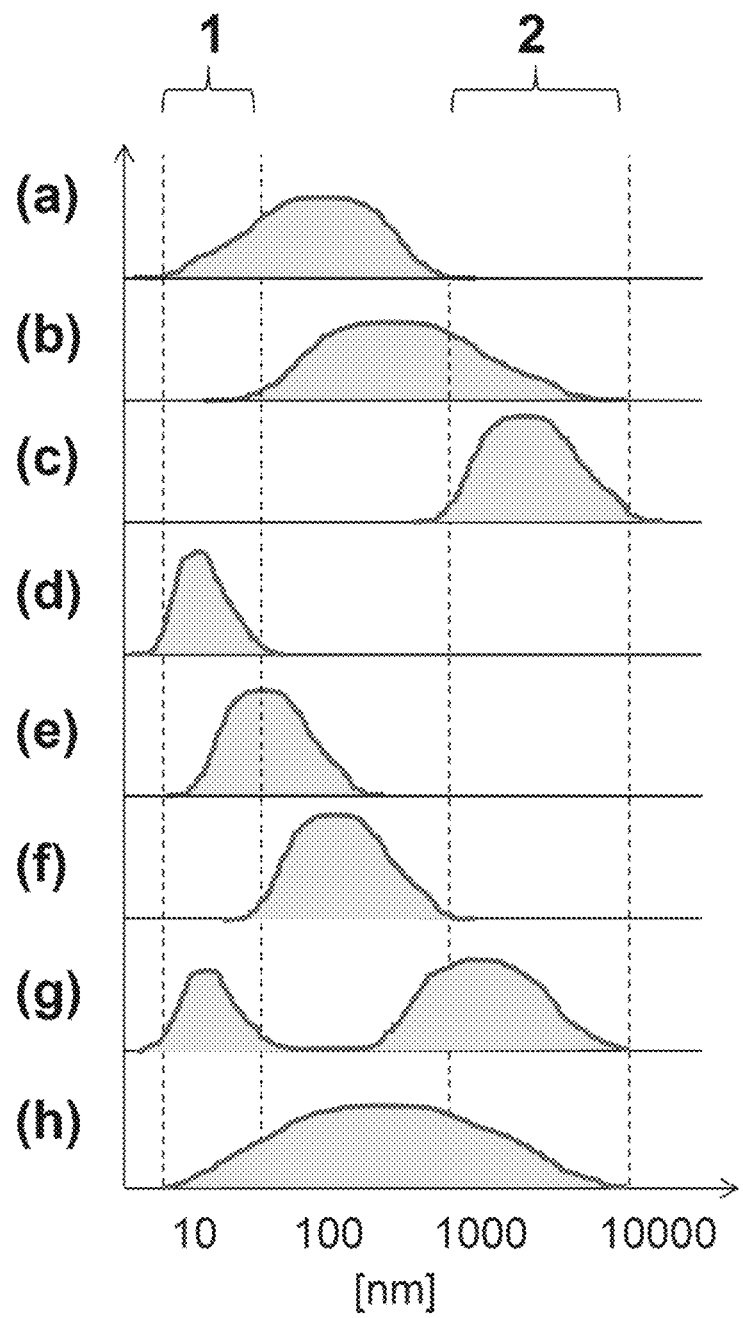
FIG. 1 illustrates a fine pore distribution of an aerogel according to an embodiment.

FIG. 1 illustrates a pattern of a fine pore distribution of an aerogel. The horizontal axis represents the pore diameter. The vertical axis represents the number. Table 1 shows proportions of the meso-pores 1 and the macro-pores 2 in FIG. 1. In Table 1, % represents a volume ratio.

TABLE 1

|     | Meso-pores 1 (%) | Macro-pores 2 (%) | Concept of Embodiment |
|-----|------------------|-------------------|------------------------|
| (a) | 30               | 0                 | x                      |
| (b) | 5                | 35                | x                      |
| (c) | 0                | 95                | x                      |
| (d) | 95               | 0                 | x                      |
| (e) | 50               | 0                 | x                      |
| (f) | 5                | 0                 | x                      |

TABLE 1-continued

|  | Meso-pores 1 (%) | Macro-pores 2 (%) | Concept of Embodiment |
|---|---|---|---|
| (g) | 25 | 55 | ○ |
| (h) | 25 | 35 | ○ |

As shown in FIG. 1, although there are eight types (a) to (h) of fine pore distribution patterns, the aerogel of the present embodiment has a fine pore distribution of the meso-pores 1 and the macro-pores 2 as shown in (g) and (h). (h) may not be bimodal.

The fine pore distribution of the meso-pores 1 is 2 to 50 nm, an average fine pore diameter is 20 to 40 nm, and a volume ratio is 15 to 60% relative to a total fine pore volume.

Here, the average fine pore diameter D can be obtained by a gas adsorption method as follows. It is possible to calculate the average fine pore diameter D based on only two physical properties, specific surface area A and total pore volume V. The average fine pore diameter D is considered to be representative of all pores with one (large) cylindrical shaped fine pore. The large cylindrical shaped fine pore has a volume V and a surface area A (side area). The fine pore is in the cylindrical shape, so that the volume V, the surface area A, and a height H of the cylinder can be determined by the following formulas.

$$V = \pi D^2 H/4 \quad \text{(Formula 1)}$$

$$A = \pi D H \quad \text{(Formula 2)}$$

When H is eliminated from Formulas 1 and 2, the following Formula is obtained.

$$D = 4V/A \quad \text{(Formula 3)}$$

The fine pore distribution of the macro-pores 2 is 1 to 10 μm, the average fine pore diameter is 2 to 6 μm, and a volume ratio relative to the total fine pore volume is preferably 7 to 60%. Within this range, the micro-pores that are smaller than 2 nm and the macro-pores that are larger than 50 nm and smaller than 1 μm may be provided. It is preferable that macro-pores larger than 10 μm are not provided. The proportion of the macro-pores in the composite material can be obtained by a micro X-ray CT measurement having a resolution of about 1 μm as porosity.

At the time, examples of the materials constituting the aerogel include metal oxide nanoparticles such as silica ($SiO_2$), titania ($TiO_2$), alumina ($Al_2O_3$), and zirconia ($ZrO_2$), organic compounds such as resorcinol-formaldehyde (RF), polyimide, and urethane, and carbon aerogels obtained by firing RF aerogels.

In the mechanism showing the peculiar behavior as described above, the macro-pores 2 inside the heat insulating material are sacrificed and collapsed at the time of pressing. On the other hand, it is considered that the meso-pore distribution survives and is maintained without collapsing. In a porous material having a fine pore diameter distribution larger than 68 nm, which is an average free path of still air (nitrogen molecules), heat transfer by convection of air is likely to occur, so that the thermal conductivity is generally high. Therefore, the thermal conductivity of the heat insulating material having a bimodal distribution decreases due to the pressing since the convection of the air is inhibited by the disappearance of the macro-pores.

<Heat Transfer Characteristic after Compression of Aerogel Composite Heat Insulating Material Having Macro-Pores 2>

The thermal conductivity of the composite heat insulating material in the embodiment when being pressurized at 0.75 to 5 MPa is preferably 1 to 10% lower than an initial thermal conductivity, and more preferably 5 to 10% lower than the initial thermal conductivity.

When the thermal conductivity of the composite heat insulating material is less than 1% lower than the initial thermal conductivity, it is difficult to inhibit a thermal chain at the time of compressing the composite heat insulating material.

When the thermal conductivity of the composite heat insulating material is 5 to 10% lower than the initial thermal conductivity, it is possible to inhibit the thermal chain at the time of compressing the composite heat insulating material.

<Raw Material Type and Raw Material Concentration of Aerogel Composite Heat Insulating Material>

As the raw material of the aerogel having the bimodal distribution, a general-purpose raw material such as a known metal alkoxide, water glass and the like is used, and water is added so as to obtain a desired raw material concentration, and a dispersion liquid or a solution is prepared and used.

Examples of the metal species include Si, Ti, Al, and Zr. Since Na ions are considered to influence a densification and high-densify of a porous structure in the high-density aerogel, water glass containing Na ions is preferably used. A silica concentration in the raw material dispersion liquid or solution is not particularly limited as long as the aerogel can be synthesized, and the concentration is preferably 6 to 22%.

<Gelling Agent and Concentration for Aerogel Composite Heat Insulating Material>

A type of the gelling agent used in the synthesis of the aerogel having meso-pores and macro-pores in the embodiment is not particularly limited, and any known gelling agent may be used. For example, mineral acids such as a hydrochloric acid, a sulfuric acid, a nitric acid, and a phosphoric acid, organic acids such as a formic acid, an acetic acid, a citric acid, and a tartaric acid, and carbonic acids such as carbon dioxide and carbonic acid ester are used. The same applies to not only silica but also titania, alumina, and zirconia.

The gelling agent is added in an additional amount so as to have a molar ratio, which is a stoichiometric ratio, of 0.50 or less relative to $NaO_2$ in sodium silicate. For example, 8 mmol of $NaO_2$ is present in 100 g sodium silicate aqueous solution containing 5 wt % $NaO_2$.

Figure 2:
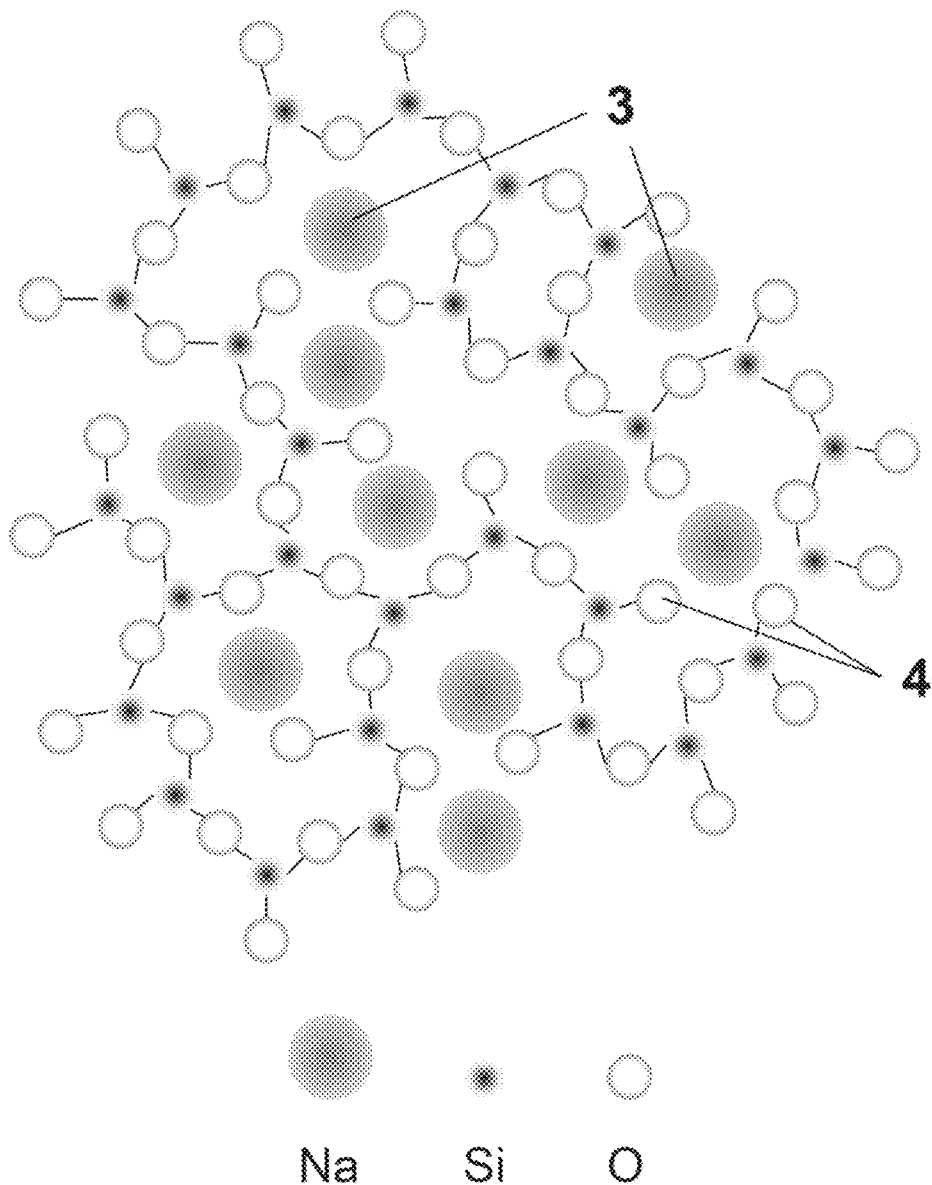
FIG. 2 illustrates unreacted Na and non-cross-linked oxygen in a siloxane skeleton according to the embodiment.

However, when the stoichiometric ratio is 0.50, that is, after adding 4 mmol or less of the gelling agent, unreacted Na3 and non-cross-linked oxygen 4 can be left in the siloxane skeleton as shown in FIG. 2. The same applies to not only silica but also titania, alumina, and zirconia.

Figure 3:
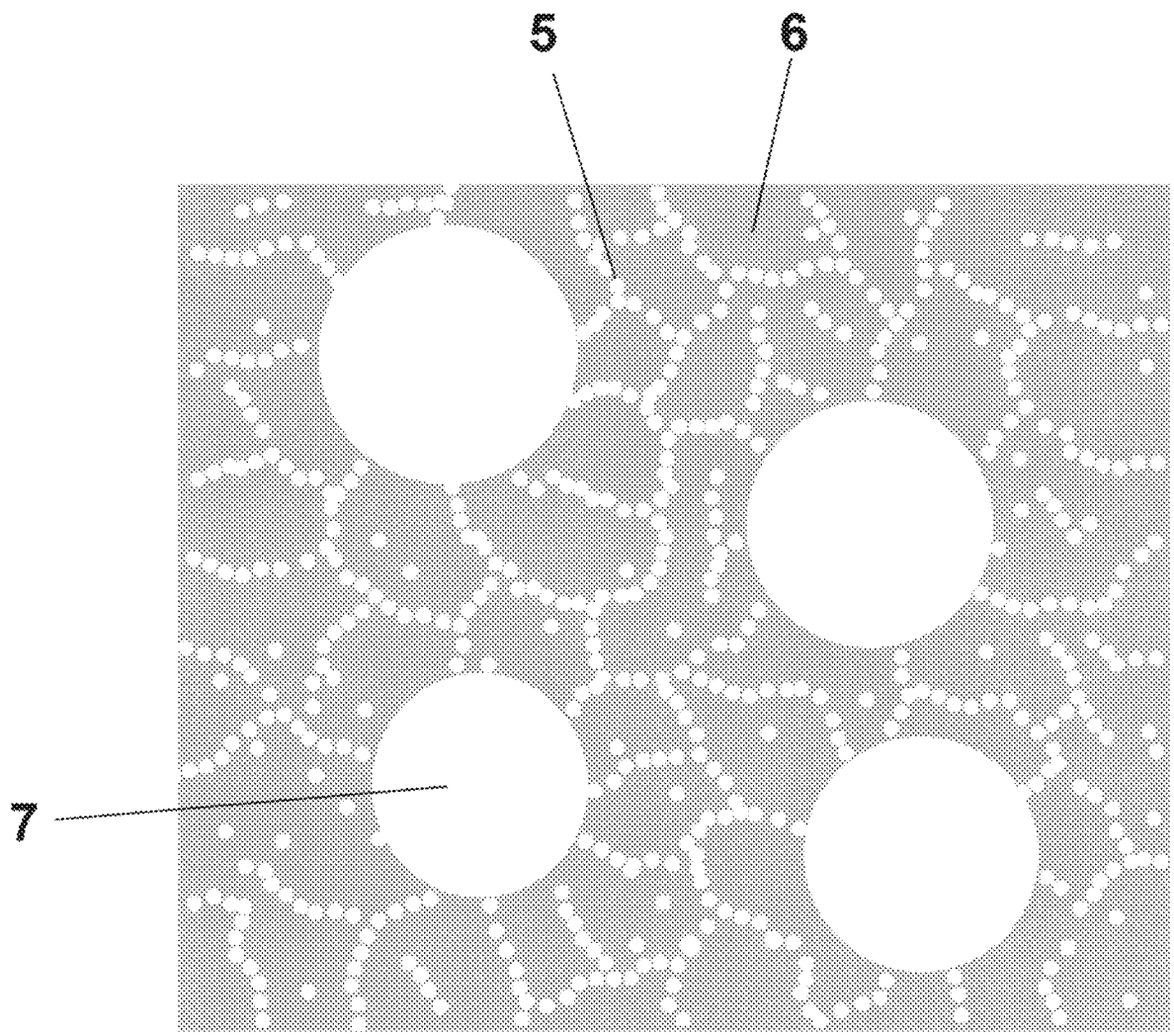
FIG. 3 illustrates a silica aerogel that has macro-pores and meso-pores according to the embodiment.

In this way, defects can be introduced at a molecular level, and as shown in FIG. 3, macro-pores 7 are generated in a skeleton of a silica aerogel 6 having meso-pores 5. The macro-pores are formed by such a mechanism. The addition amount of the gelling agent is preferably set so as to have a molar ratio of 0.1 to 0.50 relative to a stoichiometric amount of $NaO_2$ in the sodium silicate in terms of the productivity (such as an impregnation rate of raw material liquid into nonwoven fabric) and cost.

<Thickness of Aerogel Composite Heat Insulating Material>

The thickness of the aerogel composite heat insulating material is in a range of 0.03 mm to 3.0 mm, preferably in a range of 0.05 mm to 1.5 mm. If the aerogel composite heat insulating material is thinner than 0.03 mm, a heat insulating effect in a thickness direction is reduced. Therefore, if the thermal conductivity does not achieve a very low thermal conductivity close to vacuum, a heat transfer in the thickness direction from one surface to the other surface cannot be favorably reduced. If the thickness is 0.05 mm or more, the heat insulating effect in the thickness direction can be ensured. On the other hand, if the aerogel composite heat insulating material is thicker than 1.5 mm, it becomes difficult to incorporate into a vehicle and industrial equipment. In particular, when the thickness is larger than 3.0 mm, it becomes more difficult to be incorporated into the equipment in an in-vehicle field.

<Basis Weight of Nonwoven Fabric Fiber>

The basis weight of the nonwoven fabric fiber used in the manufacture of the aerogel composite heat insulating material is preferably 5 to 200 g/m² in order to maintain a minimum rigidity necessary for a support member of the aerogel. The basis weight is a weight of the fibers per unit area.

<Bulk Density of Nonwoven Fabric Fiber>

A bulk density of the nonwoven fabric fiber is preferably in a range of 100 to 500 kg/m³ from the viewpoint of increasing a content of silica xerogel in the aerogel composite heat insulating material and reducing the thermal conductivity.

In order to form a nonwoven fabric with mechanical strength as a continuum, the bulk density is necessary to be at least 100 kg/m³. In addition, when the bulk density of the nonwoven fabric is greater than 500 kg/m³, a volume space in the nonwoven fabric is small, and therefore, the silica xerogel that can be filled is relatively reduced, and the thermal conductivity is increased.

<Material of Nonwoven Fabric Fiber>

Examples of material of the nonwoven fabric fiber used in the manufacture of the aerogel composite heat insulating material include inorganic fiber based glass wool, glass paper, and rock wool, resin based polyethylene terephthalate (PET), poly phenylene sulfide (PPS), polypropylene (PP), and poly tetra fluoro ethylene (PTFE), and natural based wool, cellulose, and carbon felt.

<Method for Manufacturing Aerogel Composite Heat Insulating Material>

In order to prepare bimodal aerogels that have macro-pores and meso-pores, it is necessary to strategically introduce defects in a siloxane network at a molecular level. A basic synthesis procedure includes the three steps of a) to c):

a) impregnating a sol into a nonwoven fabric fiber structure so as to form a composite of hydrogel-nonwoven fabric fiber, the sol being prepared by adding a gelling agent so as to have a molar ratio of 0.1 to 0.75 relative to $Na_2O$ in a sodium silicate composition;

b) mixing the composite of hydrogel-nonwoven fabric fiber produced in step a) with a silylating agent so as to modify the surface thereof; and c) removing a liquid contained in the composite of surface modified hydrogel-nonwoven fabric fiber obtained in step b) by drying under a temperature and pressure lower than respective critical values.

EXAMPLE

Hereinafter, the embodiment will be described based on an example. However, the embodiment is not limited to the following example. All reactions were performed under an atmospheric condition. Conditions and results are illustrated in Table 2.

TABLE 2

|  | Example 1 | Comparative Example 1 |
|---|---|---|
| Concentration of $SiO_2$ [wt %] | 20 | 20 |
| Mole Ratio of Gelling Agent to $Na_2O$ | 0.375 | 0.75 |
| Initial Thermal Conductivity [mW/mK] | 45 | 46 |
| Thermal Conductivity after Compression [mW/mK] | 42 | 46 |
| Rate of Change in Thermal Conductivity before and after Compression [%] | 7 | 0 |
| Fine Pore Volume [cc/g] | 0.432 | 0.136 |
| Ratio of Meso-pores 1 to Total Fine Pore Volume [%] | 15 | 30 |
| Ratio of Macro-pores 2 to Total Fine Pore Volume [%] | 30 | 2 |
| Proportion of Macro-pores Obtained from a Micro-X-ray CT Image [%] | 9.25 | 5.30 |
| Comprehensive Determination | ○ | x |

<Evaluation>

In the Example, sodium silicate and carbonic acid ester were used as the raw material and the gelling agent respectively, so as to prepare a heat insulating sheet by changing a concentration of the silica in the water glass raw material, and the thermal conductivity, compressive strain, and thermal resistance were evaluated.

A thermal flow meter HFM 436 Lamda (manufactured by NETZCH) was used for the thermal conductivity measurement. The meso-pores of the aerogel composite heat insulating material were evaluated using a high-precision gas/vapor adsorption amount measuring equipment BELSORP-max 42N-VP-P (manufactured by Microtrac•BEL). The ratio (as porosity) and distribution of the macro-pores were examined by nondestructive inspection by the micro X-ray CT (three-dimensional measurement X-ray CT device: TDM 1000-IS/SP (manufactured by Yamato Scientific), three-dimensional volume rendering software: VG-Studio MAX (manufactured by Volume Graphics)). Detailed conditions of the example and the comparative example are described below.

<Acceptance Criterion of Thermal Conductivity after Compression>

It was considered to be acceptable when the thermal conductivity after three times of pressing treatment at 5.0 MPa and 50° C. for 30 minutes decreased by 5% or more with respect to an initial thermal conductivity. When the decrease is less than 5%, it is difficult to effectively inhibit the thermal chain even when a high load is applied.

Example 1

The gelling agent (ethylene carbonate) was added to a sodium silicate aqueous solution (concentration of $SiO_2$: 20 wt %, concentration of $Na_2O$: 5 wt %) such that a molar ratio of the gelling agent to $Na_2O$ is 0.375, and then the solution was finely stirred to dissolve the gelling agent to prepare a sol liquid.

Next, the sol solution was impregnated into a nonwoven fabric fiber (material; glass paper, thickness: 1 mm, basis weight: 155 g/m², dimension: 12 cm square) by pouring the sol solution into the nonwoven fabric. The nonwoven fabric impregnated with the sol solution was sandwiched between PP films (thickness: 50 μm×two sheets) and left at room temperature of 23° C. for three minutes so that the sol was gelled. After the gelling was confirmed, the impregnated nonwoven fabric with each film passed through a biaxial roll having a gap of 1.00 mm (including a thickness of the films), so that excess gel was squeezed from the nonwoven fabric to regulate the thickness to 1.00 mm.

Next, the films were peeled off and a gel sheet was immersed in a hydrochloric acid of standard 6, and then was left at room temperature of 23° C. for ten minutes to incorporate the hydrochloric acid into the gel sheet. Next, the gel sheet was immersed in a mixed liquid of octamethyltrisiloxane and 2-propanol (IPA) which is the silylating agent, and placed in a constant-temperature bath at 55° C. for a reaction of two hours. When a trimethylsiloxane bond was started to be formed, the hydrochloric acid water was discharged from the gel sheet and separated into two layers (siloxane in an upper layer, and hydrochloric acid water, 2-propenol in a lower layer). The gel sheet was transferred to the constant-temperature bath at 150° C. and dried in an air atmosphere for two hours so as to obtain a heat insulating sheet.

Figure 4:
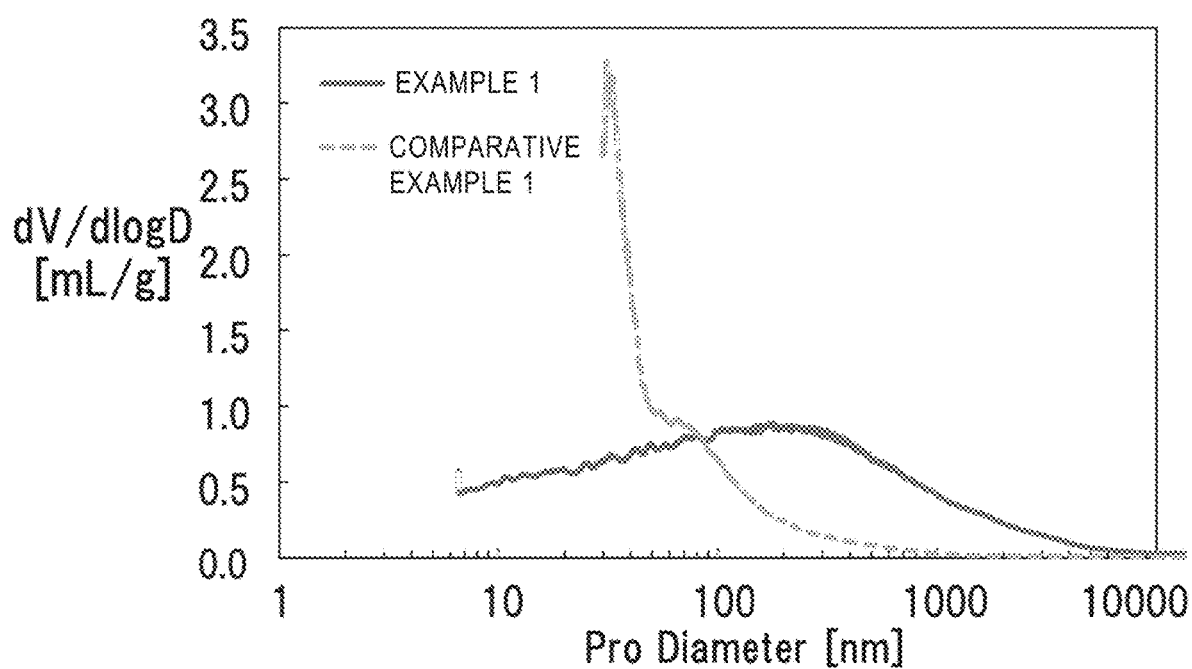
FIG. 4 illustrates results of fine pore distribution measurement by a mercury injection porosimeter.

The measured result of the thermal conductivity of the aerogel composite heat insulating material was 45 mW/mK. In addition, as shown in FIG. 4, a result of fine pore distribution measurement according to a mercury porosimeter is that a presence of macro-pores of 1 μm or more was confirmed to be 15% or more.

Figure 5:
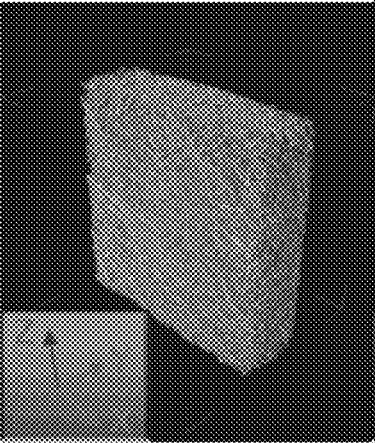
FIG. 5 is stereoscopic images and cross-sectional images of XY, YZ and XZ measured by micro X-ray CT measurement of aerogel composite heat insulating materials according to Example 1 and Comparative Example 1.

FIG. 5 illustrates a stereoscopic image of the aerogel composite heat insulating material obtained by the micro X-ray CT measurement, and cross-sectional images of XY, YZ and XZ. The resolution of the device was 1 μm, however, the presence of 1 μm macro-pores was visually confirmed.

Figure 6:
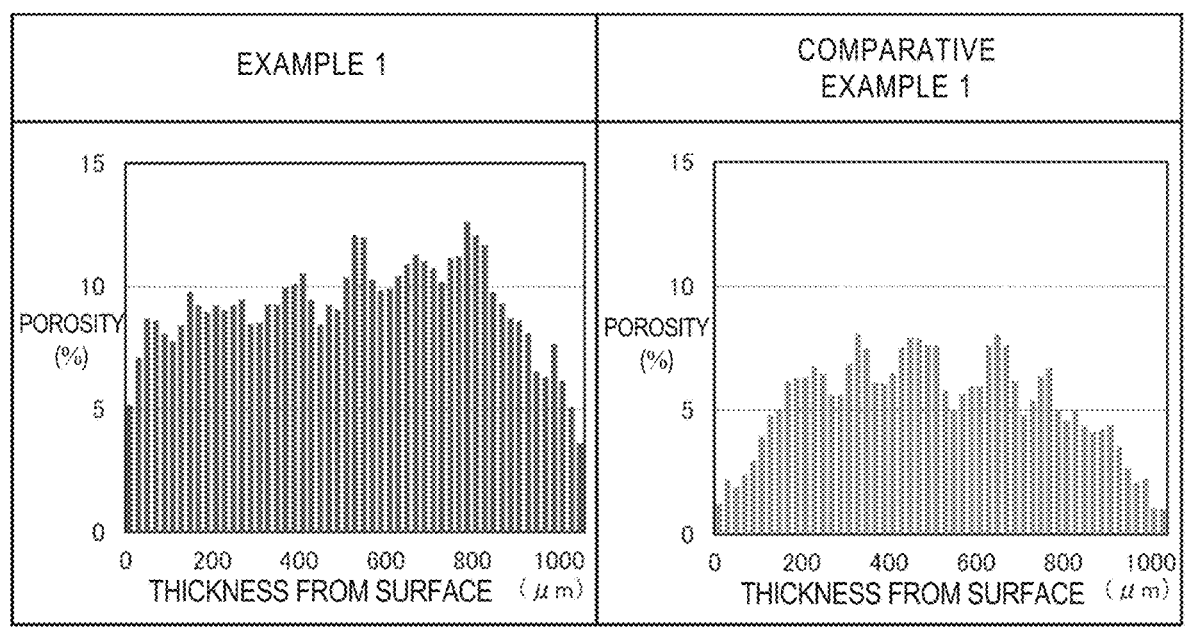
FIG. 6 illustrates distributions of macro-pores (porosity) in a film thickness direction of the aerogel composite heat insulating materials according to Example 1 and Comparative Example 1.

FIG. 6 illustrates the distribution of macro-pores (porosity) in the film thickness direction. It was determined that the proportion of the macro-pores in the vicinity of the surface was relatively small in Example 1, and the quantity of macro-pores was more than that in Comparative Example 1.

In Example 1, the proportion of the macro-pores obtained from the micro X-ray CT image was 9.25% (Table 2).

Next, a result of evaluation on the thermal conductivity after compression was 42 mW/mK, and was decreased by 7% with respect to the initial thermal conductivity (Table 2).

Comparative Example 1

A sheet was prepared under the same process conditions as in Example 1 except that an amount of the gelling agent to be added was changed such that the molar ratio was 0.75. The measured result of the thermal conductivity of the aerogel composite heat insulating material was 46 mW/mK. As a result of fine pore distribution measurement using a mercury injection porosimeter, as shown in FIG. 4, the meso-pore distribution was confirmed, but the presence of macro-pores was not confirmed. On the other hand, in the micro X-ray CT measurement, which is a non-destructive inspection, as shown in FIGS. 5 and 6, the presence of macro-pores was confirmed to be less than in Example 1. The proportion of macro-pores was 5.30% (Table 2). Next, the result of evaluation on the thermal conductivity after compression was 46 mW/mK, and no change was observed with respect to the initial thermal conductivity (Table 1).

It is preferable to use the heat insulating sheet of the embodiment between batteries of an automobile. Since the batteries of the automobile are frequently inflated and contracted by charging and discharging, the heat insulating sheet of the embodiment is suitable.

Further, in the electronic equipment, the heat insulating sheet may be used between an electronic component with heat generation and a housing.

(Overall)

Although silica has been described as the aerogel, titania, alumina, zirconia, and the like may also be used. The same applies to the pore diameter, concentration, and characteristics.

The heat insulating sheet of the embodiment is widely used because it can sufficiently exhibit a heat insulating effect even in a narrow space in electronic equipment, in-vehicle equipment, and industrial equipment. Further, the heat insulating sheet is applied to all products involving heat, such as portable equipment, displays, electrical components and the like.

What is claimed is:

1. A heat insulating material comprising:
   an aerogel that has macro-pores and meso-pores, wherein:
   a fine pore distribution of the macro-pores is 1 to 10 μm and of the meso-pores is 2 to 50 nm,
   the aerogel further includes pores having a fine pore distribution other than the macro-pores being 1 to 10 μm and the meso-pores being 2 to 50 nm, and
   a peak of a fine pore distribution of a total pore volume is located between 50 nm and 10 μm.

2. The heat insulating material according to claim 1, comprising:
   the aerogel, wherein
   an average fine pore diameter of the meso-pores is 20 to 40 nm, and
   an average fine pore diameter of the macro-pores is 2 to 6 μm.

3. The heat insulating material according to claim 1, wherein
   the aerogel has 7 to 60 vol % of the macro-pores relative to a total fine pore volume, and 15 to 60 vol % of the meso-pores relative to the total fine pore volume.

4. The heat insulating material according to claim 1, wherein
   the aerogel is retained in a nonwoven fabric fiber.

5. The heat insulating material according to claim 1, wherein
   a thermal conductivity after compression is decreased by 5% or more relative to an initial thermal conductivity.

6. The heat insulating material according to claim 5, wherein
   a thermal conductivity after compression under 5 MPa is decreased by 5% or more relative to the initial thermal conductivity.

7. The heat insulating material according to claim 1, wherein
   the aerogel is a silica aerogel.

8. A piece of electronic equipment that uses the heat insulating material according to claim 1 between an electronic component with heat generation and a housing.

9. An automobile that uses the heat insulating material according to claim 1 between batteries.

10. A heat insulating material comprising:
    an aerogel that has macro-pores and meso-pores, wherein:
    a fine pore distribution of the macro-pores is 1 to 10 μm and of the meso-pores is 2 to 50 nm,
    the aerogel further includes pores having a fine pore distribution other than the macro-pores being 1 to 10 μm and the meso-pores being 2 to 50 nm, and
    a thermal conductivity after compression is decreased by 5% or more relative to an initial thermal conductivity.

11. The heat insulating material according to claim 10, wherein
a thermal conductivity after compression under 5 MPa is decreased by 5% or more relative to the initial thermal conductivity.

\* \* \* \* \*